US007980320B2

(12) United States Patent
Inagaki et al.

(10) Patent No.: US 7,980,320 B2
(45) Date of Patent: Jul. 19, 2011

(54) ELECTRIC POWER TOOL WITH GEAR REDUCTION UNIT

(75) Inventors: Kenichiro Inagaki, Kadoma (JP); Yutaka Yamada, Kadoma (JP); Fumiaki Sekino, Kadoma (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 161 days.

(21) Appl. No.: 12/318,305

(22) Filed: Dec. 24, 2008

(65) Prior Publication Data

US 2009/0160371 A1 Jun. 25, 2009

(30) Foreign Application Priority Data

Dec. 25, 2007 (JP) ................................ 2007-332890

(51) Int. Cl.
*H02K 7/116* (2006.01)

(52) U.S. Cl. .................. 173/5; 173/217; 173/6; 173/11; 173/176

(58) Field of Classification Search .................. 173/217, 173/5, 6, 11, 176, 216; 318/12
See application file for complete search history.

(56) References Cited

U.S. PATENT DOCUMENTS 3,623,568 A * 11/1971 Mori ................................ 180/15
4,203,057 A * 5/1980 Totsu ............................ 318/285
4,375,603 A * 3/1983 Konrad .......................... 310/139
4,458,560 A * 7/1984 Frank et al. ...................... 477/39
4,641,553 A * 2/1987 Kobayashi ...................... 477/47
5,203,242 A 4/1993 Hansson
5,289,890 A * 3/1994 Toyoda et al. ............... 180/65.8
5,339,908 A 8/1994 Yokota et al.
5,343,970 A * 9/1994 Severinsky ................ 180/65.25
5,361,852 A * 11/1994 Inoue et al. .................... 173/176
5,384,522 A * 1/1995 Toriyama et al. ............. 318/371
5,403,244 A * 4/1995 Tankersley et al. ............ 477/20
5,408,411 A * 4/1995 Nakamura et al. .............. 701/48
5,457,363 A * 10/1995 Yoshii et al. .................. 318/432
5,629,593 A * 5/1997 Pollock et al. ................ 318/432
5,644,202 A * 7/1997 Toriyama et al. ............. 318/369
5,696,680 A * 12/1997 Ichioka et al. .................. 701/67

(Continued)

FOREIGN PATENT DOCUMENTS

JP 04-304975 10/1992

(Continued)

OTHER PUBLICATIONS

The Japanese Office Action dated May 18, 2010 and English summary thereof.

*Primary Examiner* — Brian D Nash
(74) *Attorney, Agent, or Firm* — Bacon & Thomas, PLLC

(57) ABSTRACT

An electric power tool includes a motor, a reduction mechanism, a driving unit, a bearing unit, a housing, a speed changing unit, a power switch, and an operation detecting unit which detects a reduction ratio changing operation performed by the speed changing unit to control electric power supplied to the motor. The reduction mechanism transfers the rotating power of the motor, and the driving unit transfers the rotating power of the reduction mechanism to a tip end tool. The bearing unit rotatably supports the driving unit, and the housing accommodates the motor, the reduction mechanism, the driving unit and the bearing unit. The speed changing unit changes a reduction ratio of the reduction mechanism, a power switch for turning on and off a power source of the motor.

15 Claims, 14 Drawing Sheets

U.S. PATENT DOCUMENTS 5,738,177 A * 4/1998 Schell et al. .................. 173/178
5,789,882 A * 8/1998 Ibaraki et al. ................. 318/148
5,804,935 A * 9/1998 Radev ........................... 318/139
5,915,801 A * 6/1999 Taga et al. ..................... 303/152
6,054,776 A * 4/2000 Sumi ............................... 290/17
6,107,761 A * 8/2000 Seto et al. ..................... 318/139
6,123,642 A * 9/2000 Saito et al. ......................... 477/3
6,163,148 A * 12/2000 Takada et al. ................. 324/226
6,232,744 B1 * 5/2001 Kawai et al. .................. 320/132
6,484,834 B2 * 11/2002 Bowen et al. ................ 180/65.6
6,510,911 B1 * 1/2003 Satou et al. .............. 180/65.245
6,536,536 B1 * 3/2003 Gass et al. ......................... 173/2
6,918,449 B2 * 7/2005 Shinagawa et al. ............... 173/2
6,971,456 B2 * 12/2005 Yamada et al. ............... 173/217
2002/0104698 A1 * 8/2002 Kanno ......................... 180/65.6
2002/0129979 A1 * 9/2002 Bowen et al. ................ 180/65.2
2003/0013571 A1 * 1/2003 Tabata .......................... 475/125

FOREIGN PATENT DOCUMENTS

JP 06-262414 9/1994
JP 7-208604 8/1995
WO 2007/025322 3/2007

* cited by examiner

ELECTRIC POWER TOOL WITH GEAR REDUCTION UNIT

FIELD OF THE INVENTION

The present invention relates to an electric power tool, such as a drill driver, a circular saw or the like, which has a speed changing function performed by a reduction mechanism.

BACKGROUND OF THE INVENTION

Generally, from the standpoint of enhanced working efficiency, there are known electric power tools with a speed changing function (see, e.g., Japanese Patent Laid-open Application No. S63-101545).

One example of the electric power tools is illustrated in FIG. 16. The electric power tool of this example includes a motor 101 as a driving power source, a reduction mechanism 102 for transferring the rotating power of the motor 101, a driving unit (not shown) for transferring the rotating power of the reduction mechanism 102 to a tip end tool, a resin-made housing 104 for containing the motor 101 and the reduction mechanism 102 in a main body portion thereof, the housing 104 provided with a handle portion 104*a*, a speed changing unit 105 and 105*a* for changing the reduction ratio of the reduction mechanism 102, the speed changing unit 105 being arranged in such a position as to allow an operator to operate the same from the outside of the housing 104, a power switch 106 for turning on and off the power source of the motor 101 held within the handle portion 104*a*, and a battery pack 107 engaged with the housing 104 for supplying electric power to the motor 101.

The speed changing unit 105 is kept in a low-speed high-torque state as illustrated in FIG. 17A when the load is high (that is, when the working load is heavy) but is switched to a high-speed low-torque state as illustrated in FIG. 17B when the load is low (that is, when the working load is light). This makes it possible to perform the desired tightening operation depending on the working load, thereby enhancing the working efficiency.

In case where the working load varies in the course of work, the speed changing unit 105 may be switched to change the reduction ratio during the work. However, this may cause trouble to the electric power tool. Specifically, if the reduction ratio is changed during work by use of the speed changing unit 105, the rotating gears 102*a* of the reduction mechanism 102 are shifted, at which time the gears 102*a* make contact with each other during their rotation and undergo wear or damage. This may be a cause of trouble in the electric power tool. Conventionally, such trouble is prevented by increasing the strength of the gears 102*a*. In this case, the gears are formed of high strength metal components or formed into a big size, which entails a drawback of high cost and increased weight.

SUMMARY OF THE INVENTION

In view of the above, the present invention provides an electric power tool capable of detecting the operation of a speed changing unit and controlling the rotation of a motor even if the speed changing unit is operated during work, thereby preventing occurrence of trouble which would otherwise be caused by the wear or damage of gears of a reduction mechanism.

In accordance with an embodiment of the present invention, there is a provided electric power tool including: a motor as a driving power source; a reduction mechanism for transferring the rotating power of the motor, the reduction mechanism having two or more gear stages; a driving unit for transferring the rotating power of the reduction mechanism to a tip end tool; a bearing unit for rotatably supporting the driving unit; a housing for accommodating the motor, the reduction mechanism, the driving unit and the bearing unit within a main body portion thereof, the housing provided with a handle portion; a speed changing unit for changing the reduction ratio of the reduction mechanism, the speed changing unit being arranged in such a position as to allow an operator to operate the same from the outside of the housing; a power switch for turning on and off a power source of the motor; and an operation detecting unit for detecting the reduction ratio changing operation performed by the speed changing unit to control the electric power supplied to the motor.

With such configuration, if an operator wishes to change the speed of the electric power tool, the operator operates the speed changing unit arranged in such a position as to allow the operator to operate the same from the outside of the housing. Even if the speed changing unit is operated to change the reduction ratio when the work load is changed during work, the operation of the speed changing unit is detected by the operation detecting unit. The electric power supplied to the motor is controlled in response to the speed changing operation thus performed.

Consequently, it is possible to prevent occurrence of trouble in the electric power tool which would otherwise be caused by the speed changing operation performed during work. It is also possible to prevent occurrence of wear or damage of gears of the reduction mechanism. In other words, when the speed changing unit 5 is operated during work, the operation of the speed changing unit 5 is detected by the operation detecting unit 6. In response to the speed changing operation thus detected, the electric power supplied to the motor 1 is controlled by the control unit 7 before gears of the reduction mechanism 2 are shifted. Therefore, it is possible to reduce or prevent wear or damage of the gears of reduction mechanism 2 when the gears are engaged with each other.

It is preferable that the operation detecting unit is operated in synchronism with the speed changing unit. In this case, it is possible to efficiently detect the operation of the operation detecting unit.

It is also preferable that the operation detecting unit is immovable with respect to the housing and is adapted to detect the operation of the speed changing unit by sensing a change in the position of the speed changing unit relative to the housing. In this case, it is possible for the operation detecting unit to easily and accurately detect the operation of the speed changing unit.

The operation detecting unit may be adapted to detect the operation of the speed changing unit without making contact with the speed changing unit. In this case, it is possible to reduce wear of the operation detecting unit and to prolong the lifespan thereof, as compared to a case where a typical switch having a mechanical contact points is used.

Further, the operation detecting unit may preferably be adapted to detect a gear shifted by the speed changing unit when changing the reduction ratio of the reduction mechanism. This assures increased detection accuracy and enhanced reliability, because the operation of the reduction mechanism is directly detected by the operation detecting unit.

Preferably, the electric power tool further includes a braking unit configured to apply brake to the motor when the operation of the speed changing unit is detected. In this case, brake is applied to the motor when the operation of the speed changing unit is detected during work. This makes it possible to further reliably prevent occurrence of trouble in the electric power tool which would otherwise be caused by the wear or damage of the gears of the reduction mechanism.

The electric power tool may further include a detecting unit configured to detect the rotational speed of the motor, and the electric power supplied to the motor is controlled only when the rotational speed of the motor at the moment of detecting the operation of the speed changing unit is greater than a predetermined value.

In this case, the predetermined value refers to the rotational speed of the motor at which the gears of the reduction mechanism are not worn or not damaged by the speed changing operation of the speed changing unit. The control of reducing the rotational speed of the motor is performed only when the rotational speed of the motor is greater than the predetermined value. Therefore, if the rotational speed of the motor remains equal to or smaller than the predetermined value despite the operation of the speed changing unit, that is, if trouble occurs in the electric power tool, it is possible to continuously use the electric power tool without having to stop the work.

Further, The electric power tool may further include a maintaining unit configured to maintain the task of controlling the electric power supplied to the motor by detecting the operation of the speed changing unit. In this case, it is possible to keep supplying the electric power to the motor, that is, it is possible to control the rotational speed of the motor 1 to be equal to or less than a predetermined value or maintain the task of controlling the motor 1 to be braked, even after the speed changing operation. Therefore, there is no need for the speed changing unit to perform the speed changing operation each time when the electric power tool is stopped and restarted. Particularly, it is possible to prevent the electric power tool from being restarted in an unstable state just after the operation of the speed changing unit, in which state the operator is hard to stably hold the tool with his or her hands. This assures safety in work.

Moreover, the electric power tool may further include a releasing unit configure to release the task of controlling the electric power supplied to the motor. In this case, it is possible to smoothly carry out the work with increased efficiency by performing the releasing operation according to the operator's intention and controlling the electric power supplied to the motor.

Preferably, the speed changing unit is formed of a double story lever operable from the outside of the housing, the double story lever having an upper story portion and a lower story portion, the upper story portion being movable toward the lower story portion, the operation detecting unit including a switch or a sensor attached to the lower story portion, the upper story portion being adapted to be pushed downwardly, upon operating the double story lever, to press the switch or activate the sensor so that the speed changing operation can be detected. In this case, it is possible for the operation detecting unit to efficiently detect the speed changing operation using the movement of the double story lever.

With the present invention, the electric power tool capable of detecting the operation of the speed changing unit and controlling the electric power supplied to the motor even if the speed changing unit is operated during work. This makes it possible to prevent occurrence of trouble in the electric power tool which would otherwise be caused by the wear or damage of gears of the reduction mechanism attributable to the speed changing operation. In addition, it is possible to avoid an increase in cost and weight, because the gears of the reduction mechanism need not to be formed of high strength metal components or formed into a big size to avoid the wear or damage thereof.

BRIEF DESCRIPTION OF THE DRAWINGS

The object and features of the present invention will become apparent from the following description of embodiments given in conjunction with the accompanying drawings, in which.

DETAILED DESCRIPTION OF THE EMBODIMENTS

Hereinafter, embodiments of the present invention will be described with reference to the accompanying drawings, which form a part hereof.

Figure 1:
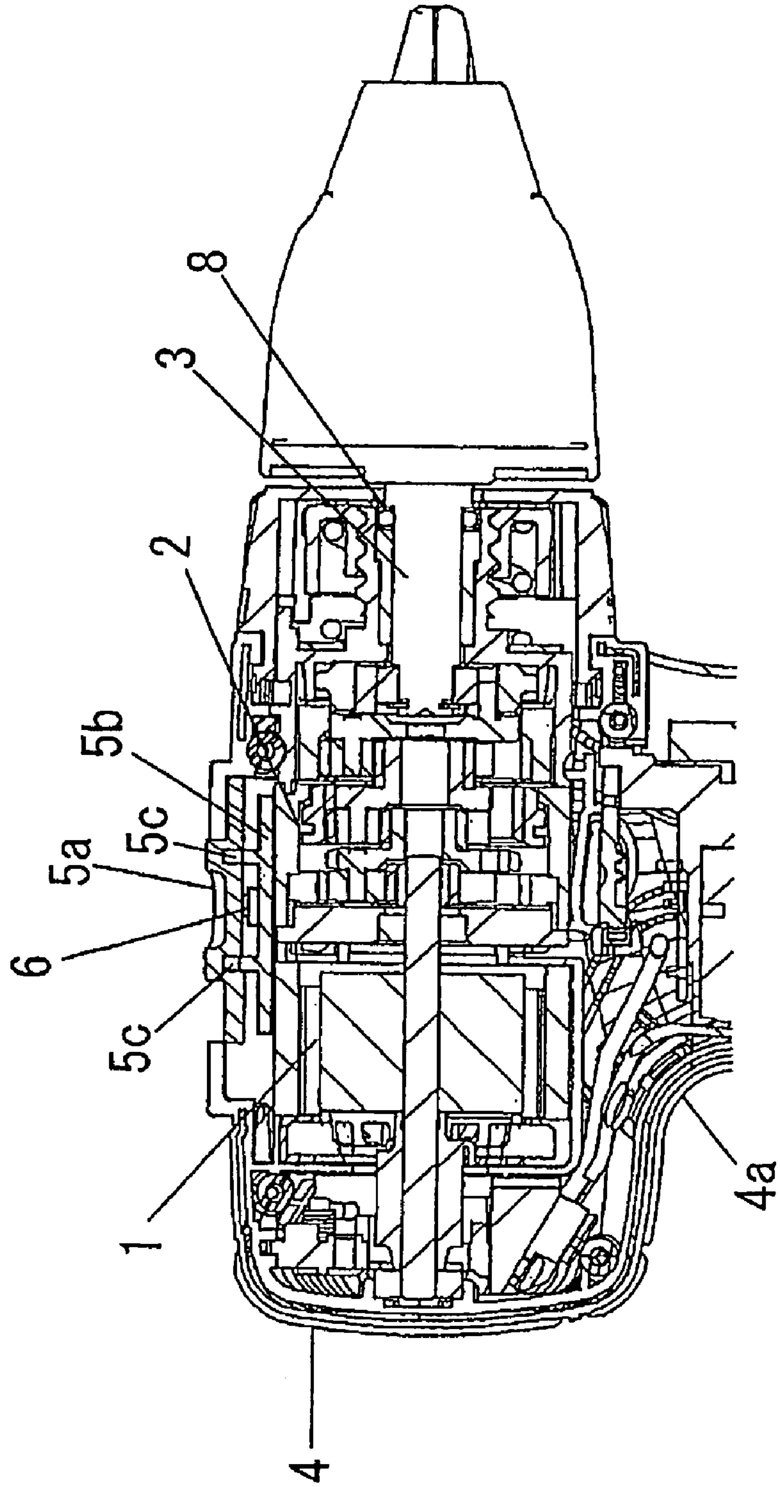
FIG. 1 is a side elevational section view showing a speed changing unit and an operation detecting unit of an electric power tool in accordance with one embodiment of the present invention.
Figure 16:
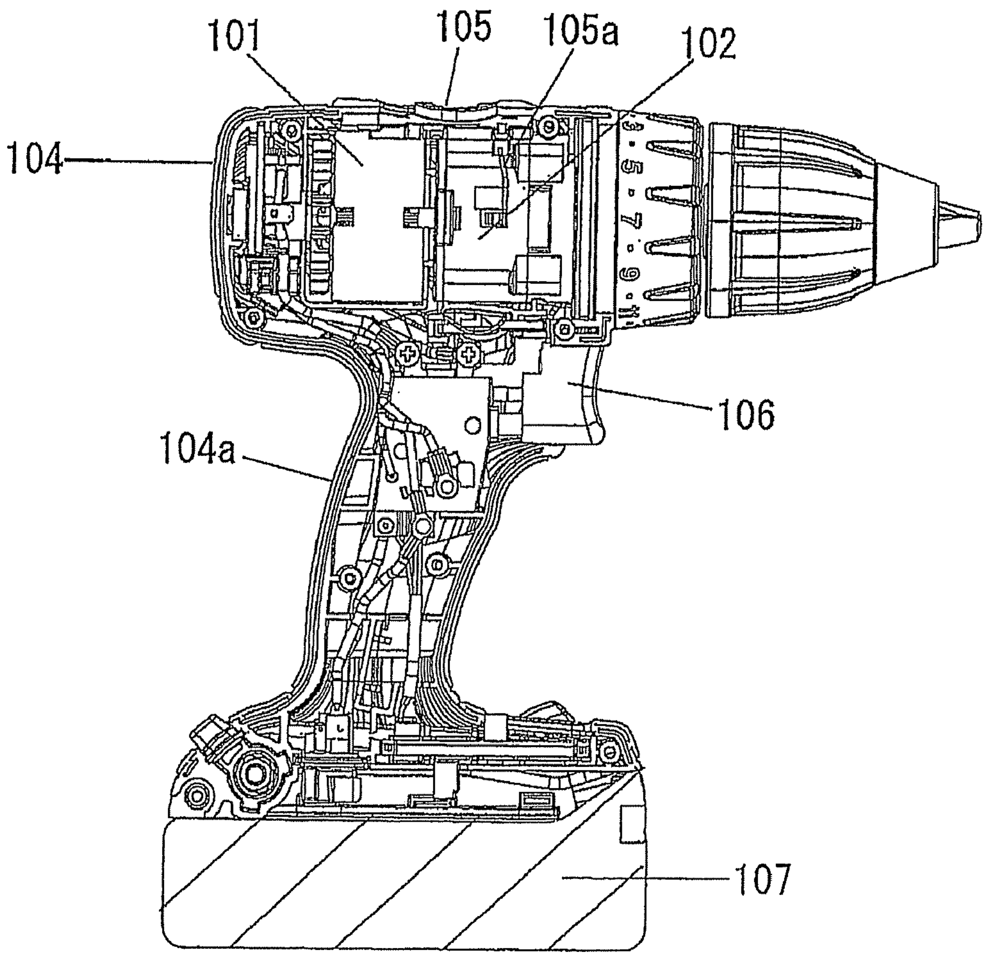
FIG. 16 (PRIOR ART)
FIG. 16 is a side elevational section view showing a conventional electric power tool.
Figure 17A:
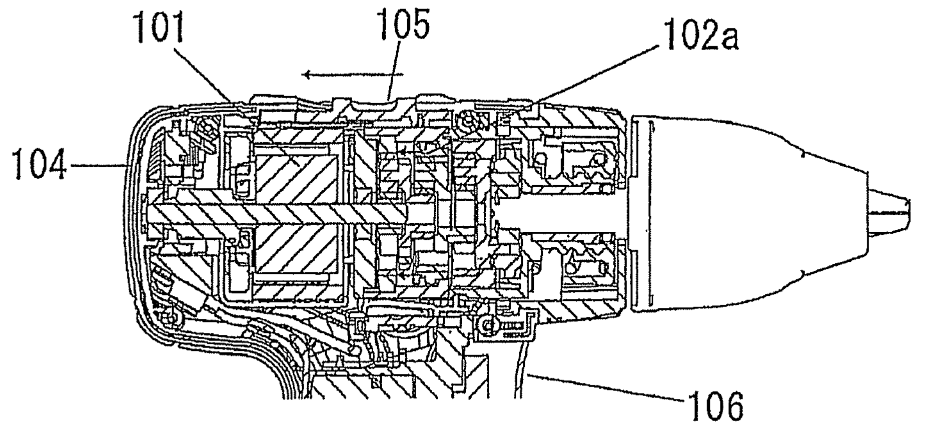
FIG. 17A (PRIOR ART)
FIGS. 17A and 17B are views for explaining the switching operation of the conventional electric power tool between a low-speed high-torque state and a high-speed low-torque state.
Figure 17B:
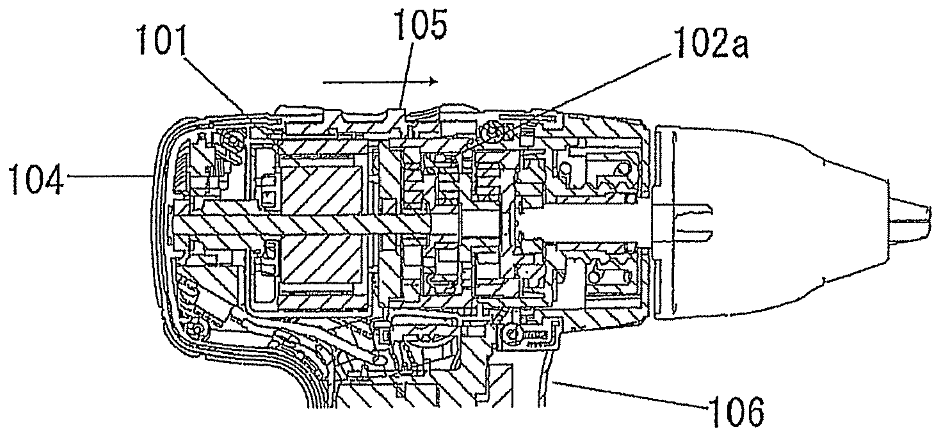
FIG. 17B (PRIOR ART)

FIG. 1 shows one example of an electric power tool of the present embodiment. The electric power tool includes a motor 1 as a driving power source, a reduction mechanism 2 for transferring the rotating power of the motor 1, the reduction mechanism 2 having two or more gear stages, a driving unit 3 for transferring the rotating power of the reduction mechanism 2 to a tip end tool, a bearing unit for rotatably supporting the driving unit 3, a housing 4 for accommodating the motor 1, the reduction mechanism 2, the driving unit 3 and the bearing unit within a main body portion thereof, the housing 4 provided with a handle portion 4*a*, a speed changing unit 5 for changing the reduction ratio of the reduction mechanism 2, the speed changing unit 5 being arranged in such a position as to allow an operator to operate the same from the outside of the housing 4, a power switch 106 (see FIG. 16) for turning on and off a power source of the motor 1, and a battery pack 107 (see FIG. 16) engaged with the housing 4 for supplying electric power to the motor 1.

In this regard, the electric power tool of the embodiment of the present invention includes an operation detecting unit 6 for detecting the operation of the speed changing unit 5, which is a reduction ratio changing operation of the reduction mechanism 2 performed by the speed changing unit 5, and controlling the electric power supplied to the motor 1.

The speed changing unit 5 of this example is formed of a double story lever 5*a* and 5*b* capable of shifting back and forth on an outer surface of the housing 4, the double story lever 5*a* and 5*b* having an upper story portion 5*a* and a lower story portion 5*b*. The upper story portion 5*a* is depressible downwardly along a guide portion 5*c*. The operation detecting unit 6 includes a switch 6*a* attached to the lower story portion 5*b*. The upper story portion 5*a* is biased away from the lower story portion 5*b* (upwardly) by means of a spring (not shown). The speed changing operation of the double story lever 5*a* and 5*b* is performed in two steps including a pushing operation of the upper story portion 5*a* and a shifting operation thereof. At this time, the upper story portion 5*a* is pushed downwardly to press the switch 6*a* attached to the lower story portion 5*b*, whereby the speed changing operation is detected.

In the present embodiment, the shifting direction of the double story lever 5*a* and 5*b* is such that, as the double story lever 5*a* and 5*b* is shifted along a rotating shaft 8 of the motor 1 (in the speed changing operation direction), the upper story portion 5*a* is moved perpendicularly to the rotating shaft 8 of the motor 1 to thereby drive the operation detecting unit 6 provided in the lower story portion 5*b*. In response, the speed changing operation is detected and the electric power supplied to the motor 1 is controlled.

Figure 2:
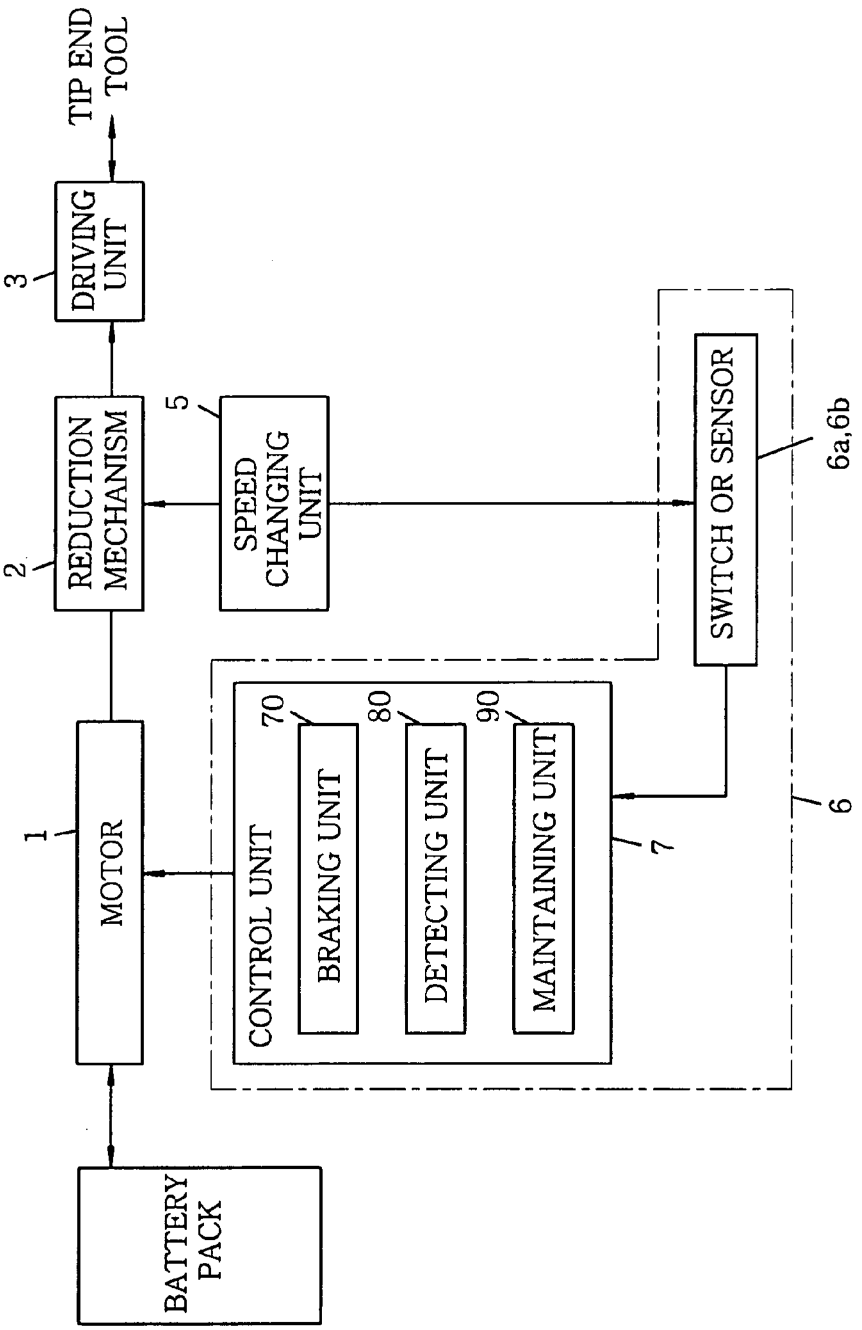
FIG. 2 is a block diagram of the electric power tool shown in FIG. 1.

The operation detecting unit 6 includes a switch 6*a* for detecting the speed changing operation and a control unit 7 (see FIG. 2) for controlling the electric power supplied to the motor 1 depending on the speed changing operation thus detected.

Figure 3:
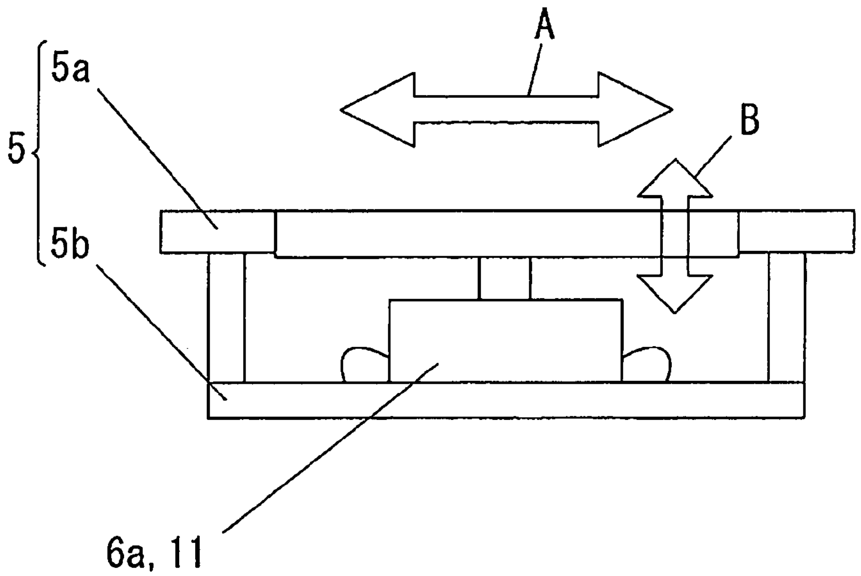
FIG. 3 is a view for explaining an instance where a tact switch of the operation detecting unit is installed in a lower story portion of a double story lever of the speed changing unit.
Figure 4:
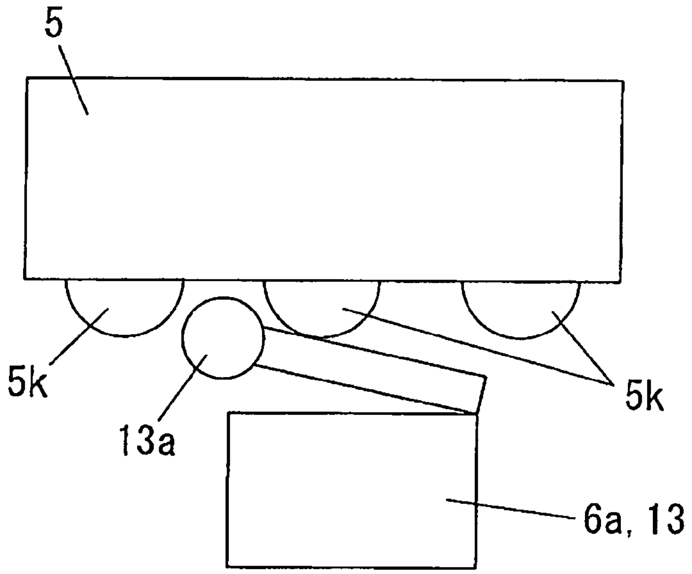
FIG. 4 is a view for explaining an instance where a limit switch (or a micro switch) of the operation detecting unit is installed below the speed changing unit.

The switch 6*a* of the operation detecting unit 6 may be of a type having a mechanical contact. Examples of the switch 6*a* include a tact switch 11 as shown in FIG. 3 and a limit switch 13 or a micro switch having an elastic contact member 13*a* contactable with a protrusion portion 5*k* of the speed changing unit 5 as shown in FIG. 4. It is preferred that the switch 6*a* is superior in the mechanical strength and the environmental resistance. In FIG. 3, arrow A indicates the shifting direction of the double story lever 5*a* and 5*b* and arrow B indicates the push-down direction of the upper story portion 5*a*.

Figure 5:
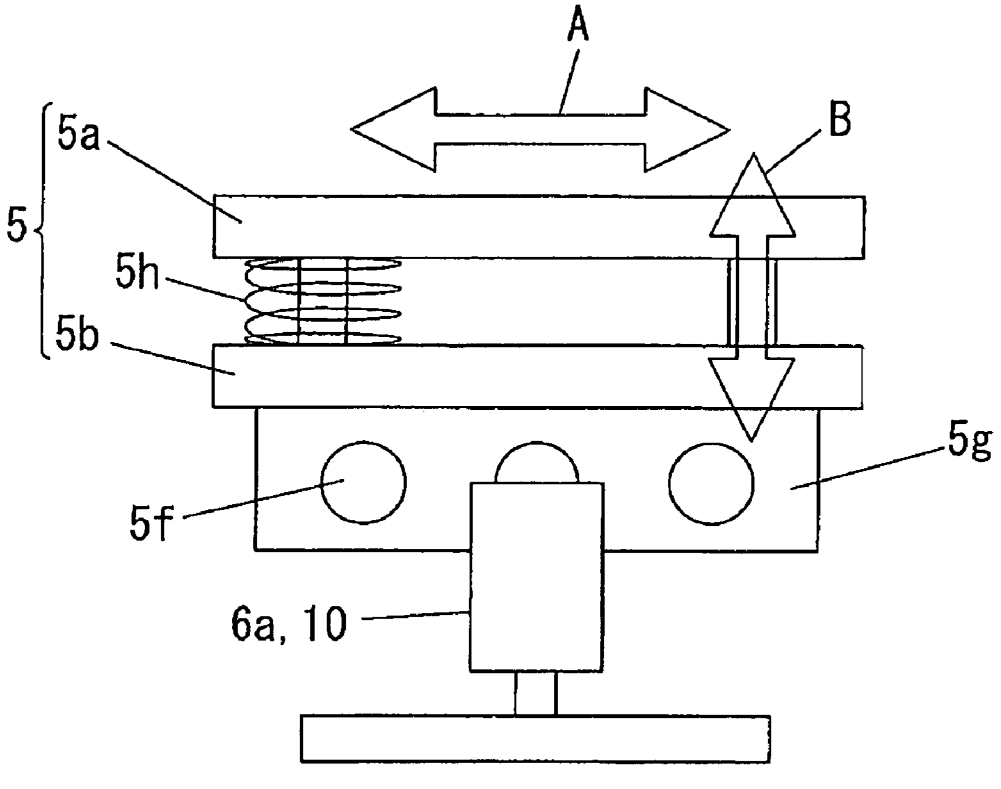
FIG. 5 is a view for explaining an instance where a photo interrupter of the operation detecting unit is installed on a lower story portion of a double story lever of the speed changing unit.

The switch 6*a* of the operation detecting unit 6 may be of a type that detects the speed changing operation without making contact with the speed changing unit 5. For example, it may be possible to use a photo interrupter 10 as shown in FIG. 5.

In this regard, opening portions 5*f* and non-opening portions 5*g* are alternately provided in the lower story portion 5*b* of the double story lever 5*a* and 5*b* along the shifting direction indicated by arrow A. When the upper story portion 5*a* is pushed down in the direction indicated by arrow B, the photo interrupter 10 optically detects the opening portions 5*f* or the non-opening portions 5*g*. The electric power supplied to the motor 1 is controlled based on the results of detection. Reference numeral 5*h* in FIG. 5 designates a spring. The photo interrupter 10 is a non-contact type and therefore can enjoy a prolonged lifespan. Furthermore, since the lead line through which the signal detected by a sensor is transmitted to a motor power circuit is kept stationary regardless of the operation of the speed changing unit 5, the photo interrupter 10 shows an extremely low probability of line breakage caused by flexural deformation and exhibits increased reliability.

Figure 6:
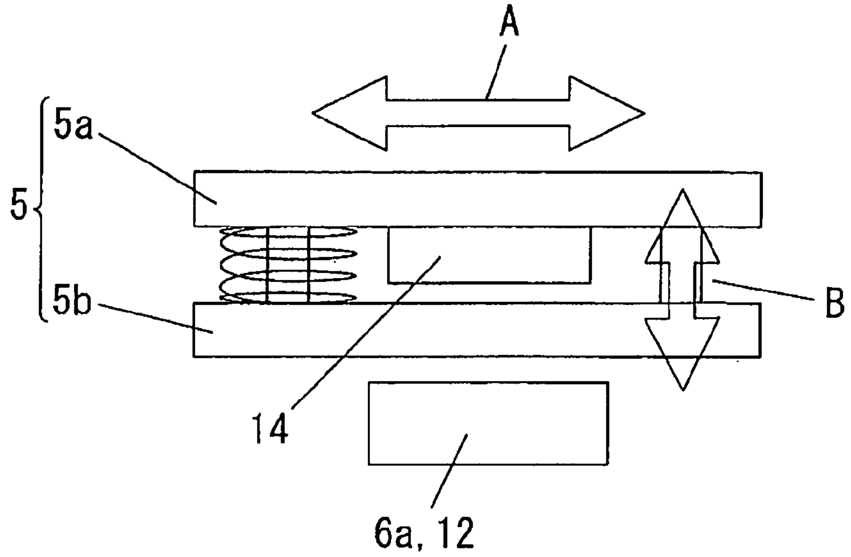
FIG. 6 is a view for explaining an instance where a hall sensor of the operation detecting unit is installed on a lower story portion of a double story lever of the speed changing unit.
Figure 7:
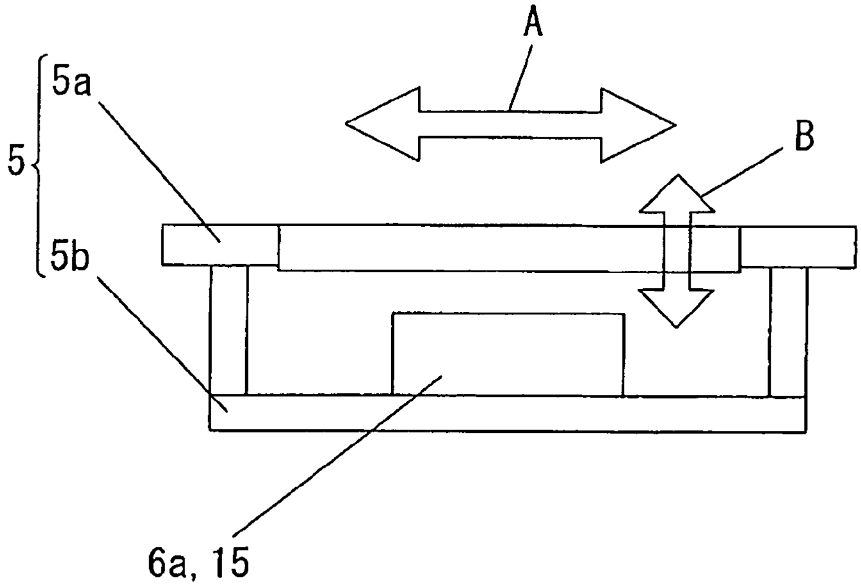
FIG. 7 is a view for explaining an instance where a pressure sensing switch of the operation detecting unit is installed in a lower story portion of a double story lever of the speed changing unit.

As another example of the switch 6*a* of the operation detecting unit 6, it may be possible to use a hall sensor 12 as shown in FIG. 6, which generates a voltage depending on the intensity of a magnetic field. The hall sensor 12 detects the intensity of a magnetic field formed by a magnet 14 provided in the upper story portion 5*a* of the double story lever 5*a* and 5*b* to control the electric power supplied to the motor 1. As a further example of the switch 6*a*, it may be possible to use a pressure sensing switch 15 as shown in FIG. 7. With the pressure sensing switch 15, the pressure generated when the upper story portion 5*a* of the double story lever 5*a* and 5*b* is pushed down is converted to an electric resistance. The electric power supplied to the motor 1 is controlled depending on the electric resistance thus converted.

With the construction described above, if an operator wishes to change the speed of the electric power tool, the operator operates the speed changing unit 5 arranged in such a position as to allow the operator to operate same from the outside of the housing 4. Even if the speed changing unit 5 is operated to change the reduction ratio when the work load is changed during work, the operation of the speed changing unit 5 is detected by the operation detecting unit 6. In response to the speed changing operation thus performed, the electric power supplied to the motor 1 is controlled by the control unit 7.

In other words, when the speed changing operation detected is intended to shift a high load operation to a low load operation, the electric power supplied to the motor 1 is controlled so that the output of the motor 1 can be changed from a low-speed high-torque state to a high-speed low-torque state. In contrast, when the speed changing operation detected is intended to shift a low load operation to a high load operation, the electric power supplied to the motor 1 is controlled so that the output of the motor 1 can be changed from a high-speed low-torque state to a low-speed high-torque state.

Consequently, it is possible to prevent occurrence of wear or damage of gears of the reduction mechanism 2 which would be conventionally caused by the mutual contact of the gears during their rotation. It is also possible to prevent occurrence of trouble which would otherwise be caused by the speed changing operation performed during work. In other words, when the speed changing unit 5 is operated during work, the operation of the speed changing unit 5 is detected by the operation detecting unit 6. In response to the speed changing operation thus detected, the electric power supplied to the motor 1 is controlled by the control unit 7 before gears of the reduction mechanism 2 are shifted. Therefore, it is possible to reduce or prevent wear or damage of the gears of reduction mechanism 2 when the gears are engaged with each other.

In addition, since the gears of the reduction mechanism 2 need not to be formed of high strength metal components or formed into a big size to avoid the wear or damage thereof, there is provided an advantage in that it is possible to avoid an increase in cost and weight.

Figure 8:
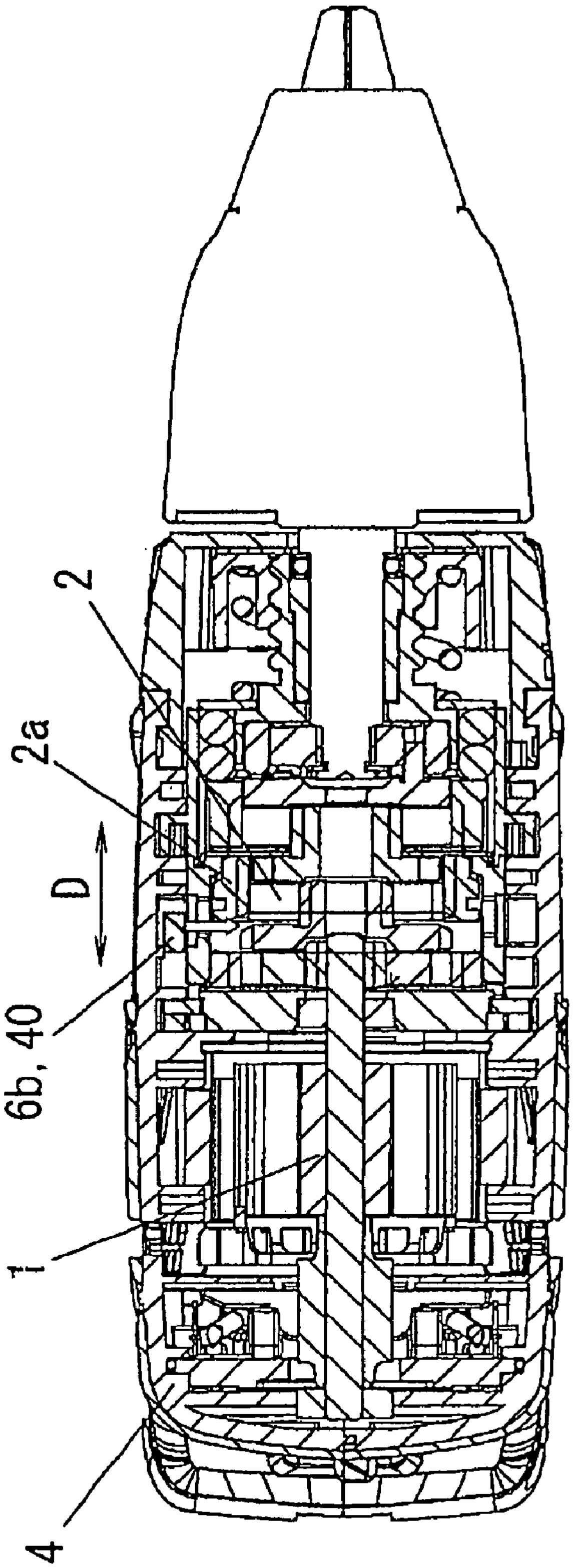
FIG. 8 is a sectional view illustrating one example of an instance where a laser sensor of the operation detecting unit is fixed to a housing and a light reflecting surface for reflecting laser light is formed on a gear of the speed changing unit.
Figure 9:
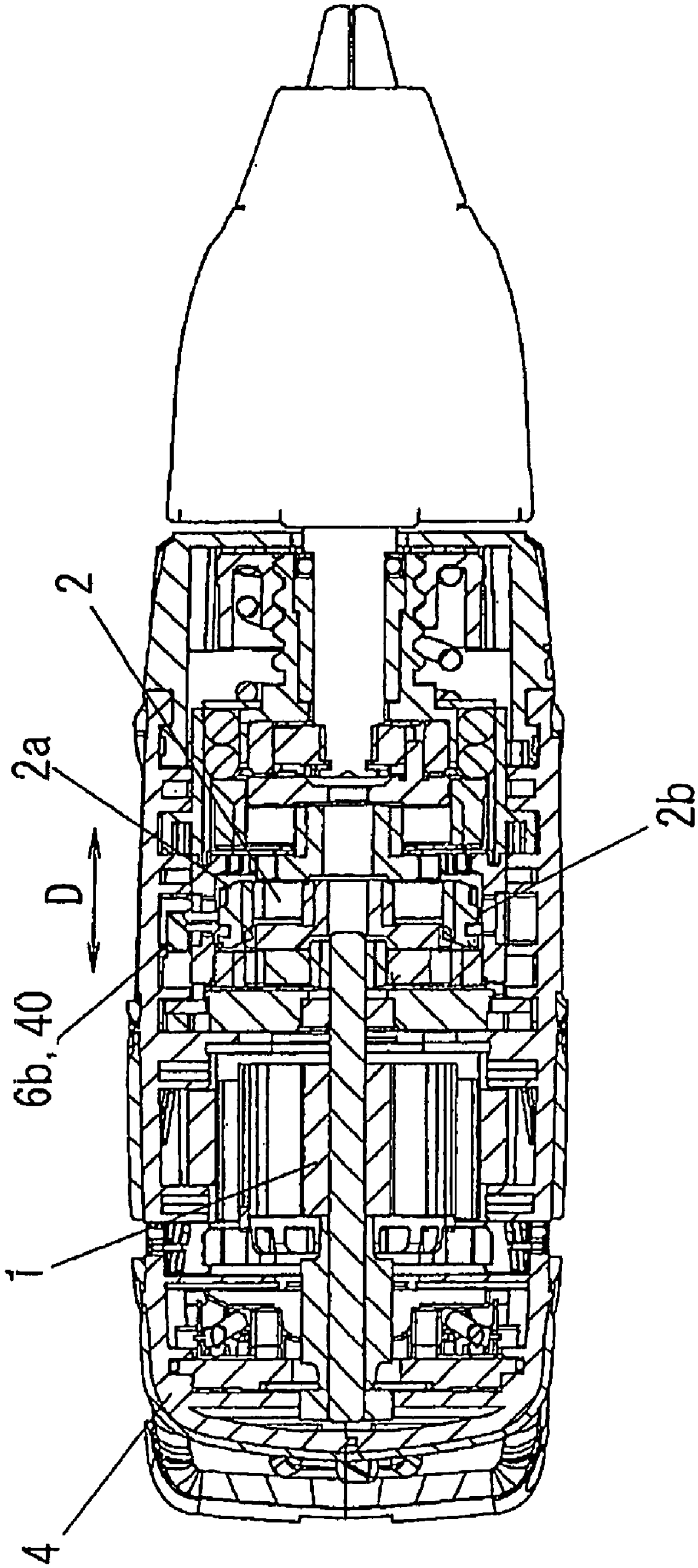
FIG. 9 is a view for explaining a state that the laser sensor shown in FIG. 8 has received the laser light reflected from the light reflecting surface of a gear of the speed changing unit and has detected the speed changing operation.

FIGS. 8 and 9 shows one example of an instance where the operation detecting unit 6 is kept immovable with respect to the housing 4 and where the operation of the speed changing unit 5 is detected by sensing a change in the position of a member of reduction mechanism 2 relative to the housing 4. The operation detecting unit 6 in this example detects the displacement of a gear, e.g., a ring gear 2*a*, of the reduction mechanism 2 in an axial direction D. A light reflecting surface is formed on the outer circumferential wall portion 2*b* of the ring gear 2*a* that will be moved during the speed changing operation. As the switch 6*b* of the operation detecting unit 6, a laser sensor 40 is fixedly secured to the inner surface of a gear casing that accommodates the ring gear 2*a*.

If laser light impinges on the light reflecting surface in the state shown in FIG. 9, the laser light is reflected toward the laser sensor 40, as a result of which the position of the ring gear 2*a* is detected. At this time, the change in the relative position of the ring gear 2*a* and the laser sensor 40 is detected to control the electric power supplied to the motor 1. If the speed changing unit 5 is operated during work, the movement of the ring gear 2*a* is detected by the above-noted unit to thereby control rotation of the motor 1. Therefore, it is possible to prevent occurrence of trouble in the electric power tool which would otherwise be caused by the wear or damage of the gears of the reduction mechanism 2.

Moreover, the operation detecting unit 6 in this example detects the operation of the speed changing unit 5 by directly sensing the ring gear 2*a* shifted when the reduction ratio of the reduction mechanism 2 is changed. This assures increased detection accuracy and enhanced reliability. In addition, the operation detecting unit 6 is operated in synchronism with the speed changing unit 5. This provides an advantage in that the operation detecting unit 6 is capable of efficiently performing its detection task.

As a further example, it is preferred to provide a braking unit 70 for applying brake to the motor 1 when the operation detecting unit 6 has detected the operation of the speed changing unit 5. In this case, the control unit 7 is provided with an electronic circuit for forcibly slowing down and stopping the motor 1 when the operation of the speed changing unit 5, that is, when the speed changing unit 5 is being shifted, is detected, during work. This makes it possible to further reliably prevent occurrence of trouble in the electric power tool which would otherwise be caused by the wear or damage of the gears of the reduction mechanism 2.

As a still further example, in the operation detecting unit 6, it may be possible to provide a detecting unit 80 for detecting the rotational speed of the motor 1. The electric power supplied to the motor 1 may be controlled only when the rotational speed of the motor 1 at the moment of detecting the operation of the speed changing unit 5 is greater than a predetermined value.

In this regard, the predetermined value refers to the rotational speed of the motor 1 at which the gears of the reduction mechanism 2 are not worn or not damaged by the speed changing operation of the speed changing unit 5. The control of reducing the rotational speed of the motor 1 is performed only when the rotational speed of the motor 1 is greater than the predetermined value. Therefore, if the rotational speed of the motor 1 remains equal to or smaller than the predetermined value when the speed changing unit 5 is operated, that is, if no trouble occurs in the electric power tool, it is possible to continuously use the electric power tool without having to stop the work.

As a yet still further example, it is preferred to provide a maintaining unit 90 configured to maintain the task of controlling the electric power supplied to the motor 1 by detecting the operation of the speed changing unit 5. The maintaining unit 90 is adapted to, e.g., store the speed changing information in the electronic circuit of the control unit 7 that receives a detection signal from the operation detecting unit 6.

Figure 12:
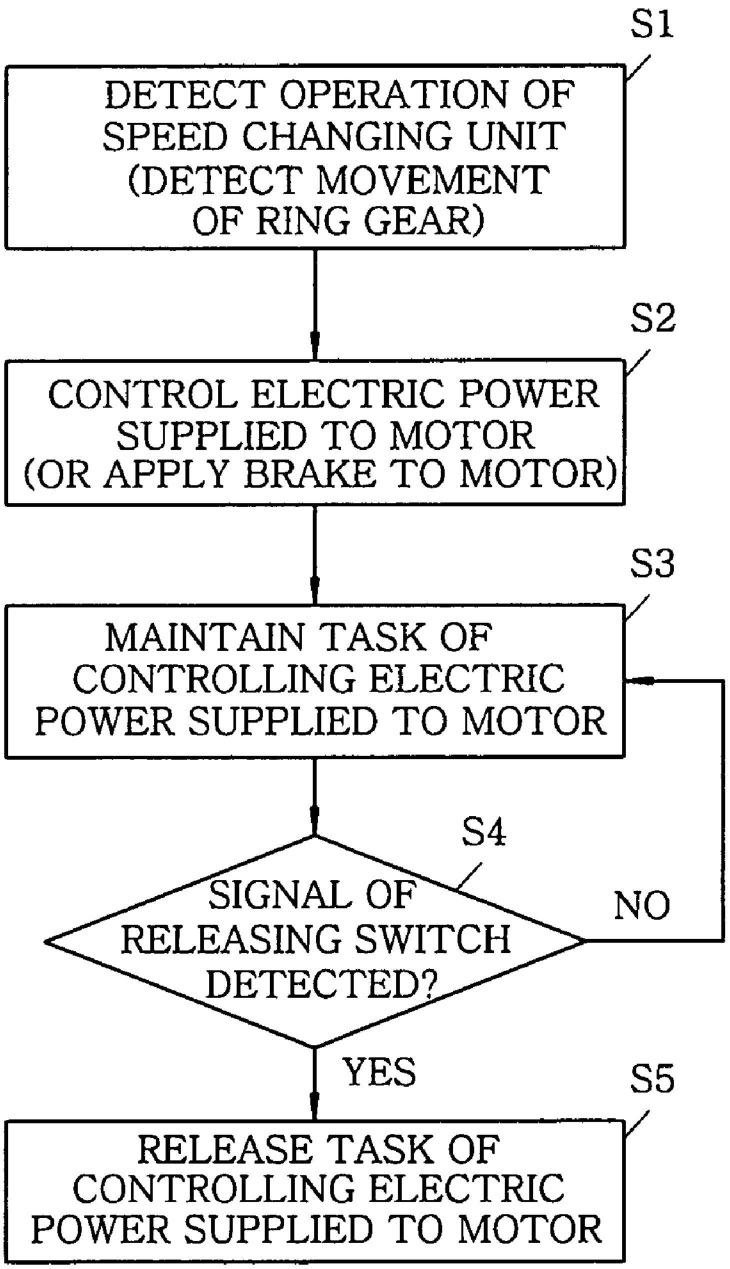
FIG. 12 is a control flowchart of a circuit for maintaining the task of controlling the electric power supplied to the motor.

FIG. 12 illustrates one example of a flowchart for maintaining the task of controlling the electric power supplied to the motor 1, that is, for maintaining the task of controlling the rotational speed of the motor 1 to be equal to or less than a predetermined value or maintaining the task of controlling the motor 1 to be braked. At first, shifting operation of the speed changing unit 5 is detected by the operation detecting unit 6 in step S1. In response to the speed changing operation thus detected, the electric power supplied to the motor 1 is controlled such that the rotational speed of the motor 1 is to be equal to or less than the predetermined value (or, the motor 1 is to be braked) in Step S2. In step S3 and S4, supplying electric power to the motor 1 is controlled until a release signal is detected by a releasing unit. In step S5, when the releasing signal is detected, the control of the electric power supplied to the motor 1 is released.

If the maintaining unit 90 is absent, the following situation would occur. As an operator operates the speed changing unit 5 during work, the electric power supplied to the motor 1 is controlled in such a manner as to stop the operation of the electric power tool. If the operator finishes operating the speed changing unit 5 in this state, the task of controlling the electric power supplied to the motor 1 is released and the electric power tool is restarted. At this time, the electric power tool is restarted in an unstable state just after the operation of the speed changing unit 5, in which state the operator is hard to stably hold the tool with his or her hands. For that reason, the operator may be injured or the workpiece may be damaged.

Provision of the maintaining unit configured to maintain the task of controlling the electric power supplied to the motor 1 by detecting the operation of the speed changing unit 5 ensures that the electric power tool is prevented from being restarted in a state that the operator holds the tool unstably with the hands. This assures safety in work.

Depending on the intention of the operator, it is preferred to provide a releasing unit for releasing the task of controlling the electric power supplied to the motor 1. As the releasing unit, there may be a method in which the power switch 106 for turning on and off the power source of the motor 1 held within the handle portion 4*a* is reactivated, that is, the power switch 106 is fully released and pushed back, and the signal indicative of the reactivation is sent to the electronic circuit of the control unit 7 to release the task of controlling the electric power. The releasing unit may be a method in which the task of controlling the electric power supplied to the motor 1 is released when the power switch 106 for turning on and off the power source of the motor 1 held within the handle portion 4*a* is in an off-state.

Figure 13:
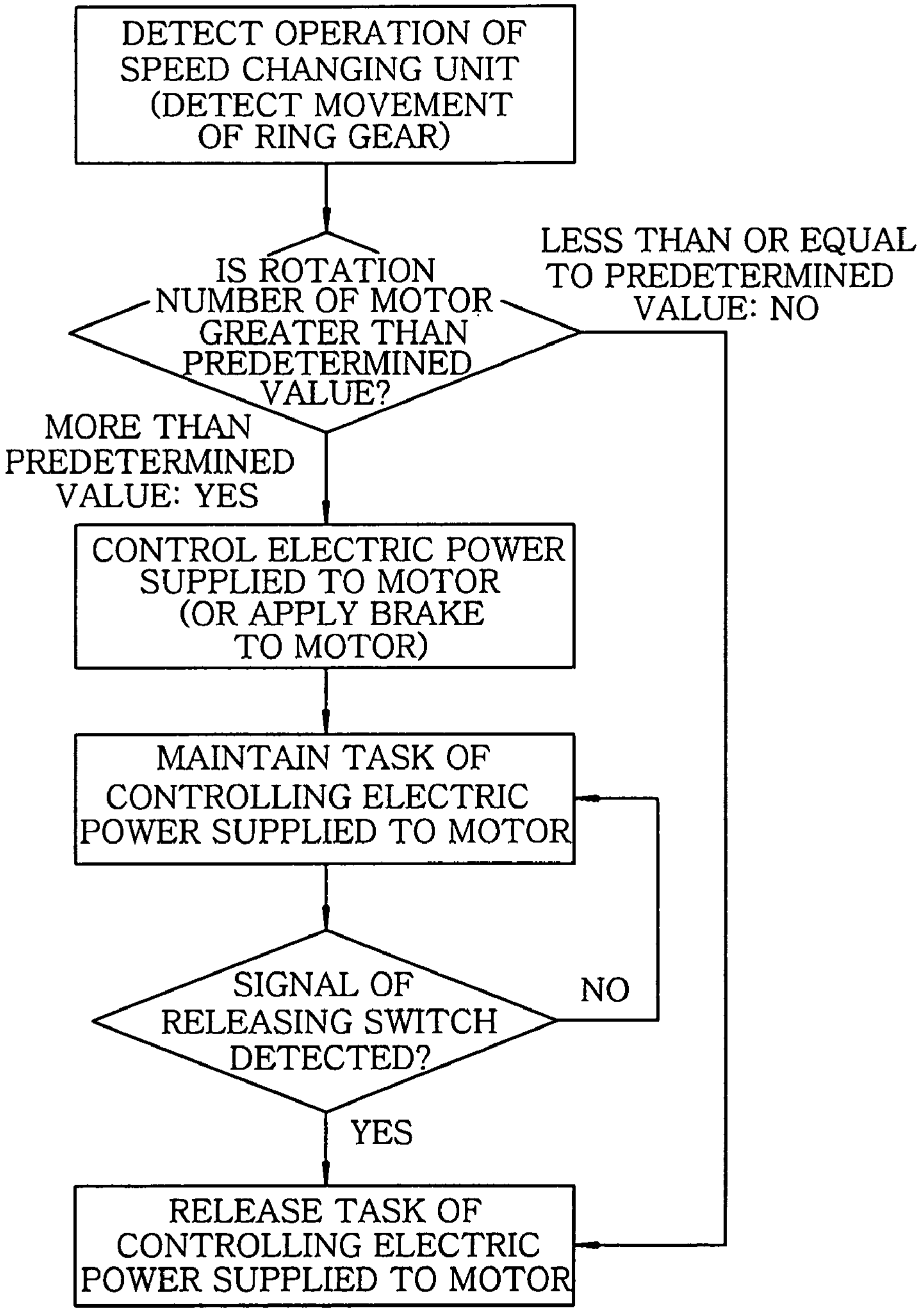
FIG. 13 is a control flowchart of a circuit for releasing the task of controlling the electric power supplied to the motor.

Alternatively, it may be possible to separately provide a releasing switch (not shown). FIG. 13 illustrates one example of a flowchart for releasing the task of controlling the electric power supplied to the motor 1. By performing the releasing operation according to the operator's intention and controlling the electric power supplied to the motor 1 in this manner, it is possible to smoothly carry out the work. This assists in increasing the work efficiency with no consideration that the operator is injured or the workpiece is damaged.

Figure 10:
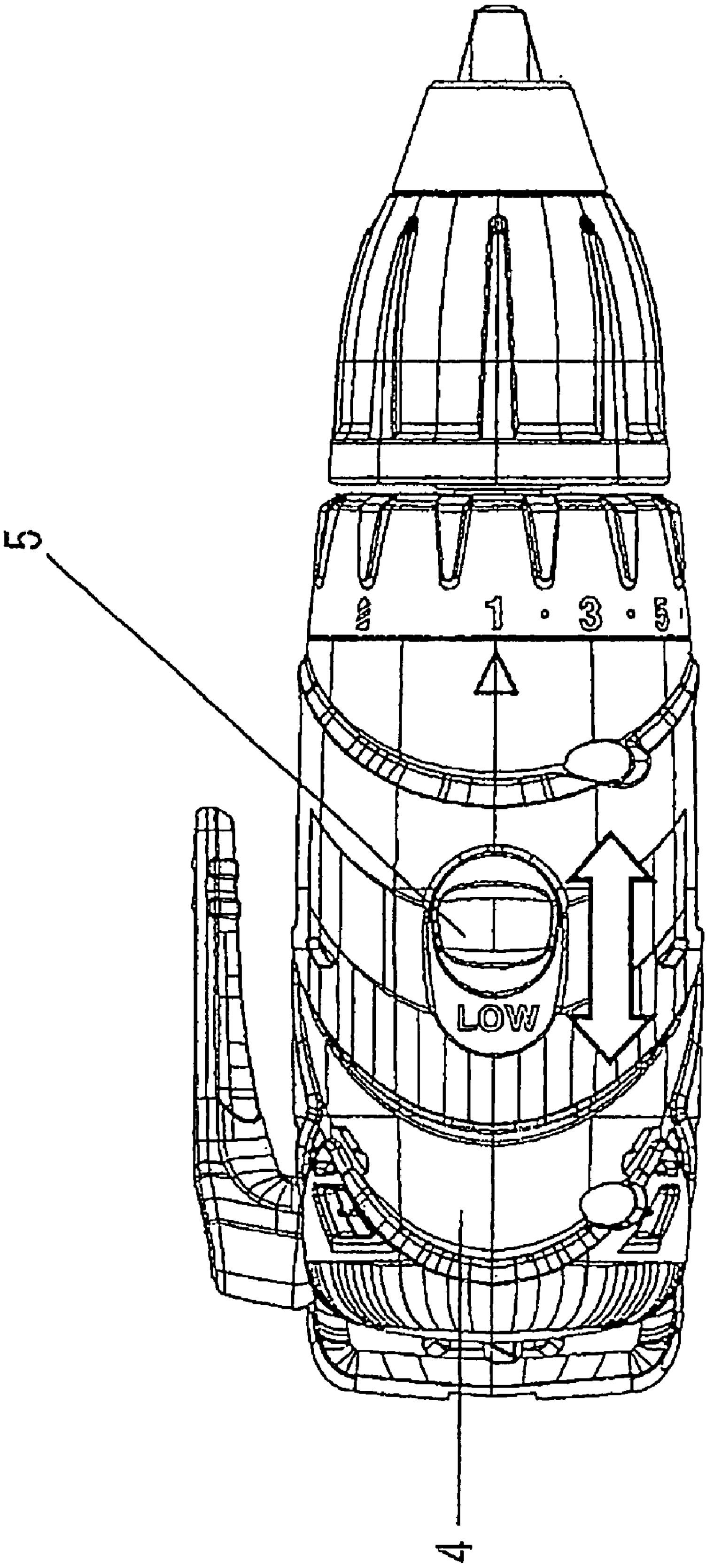
FIG. 10 is a plan view illustrating one example of an instance where the operation direction of the speed changing unit is parallel to the rotating shaft of a motor.
Figure 11:
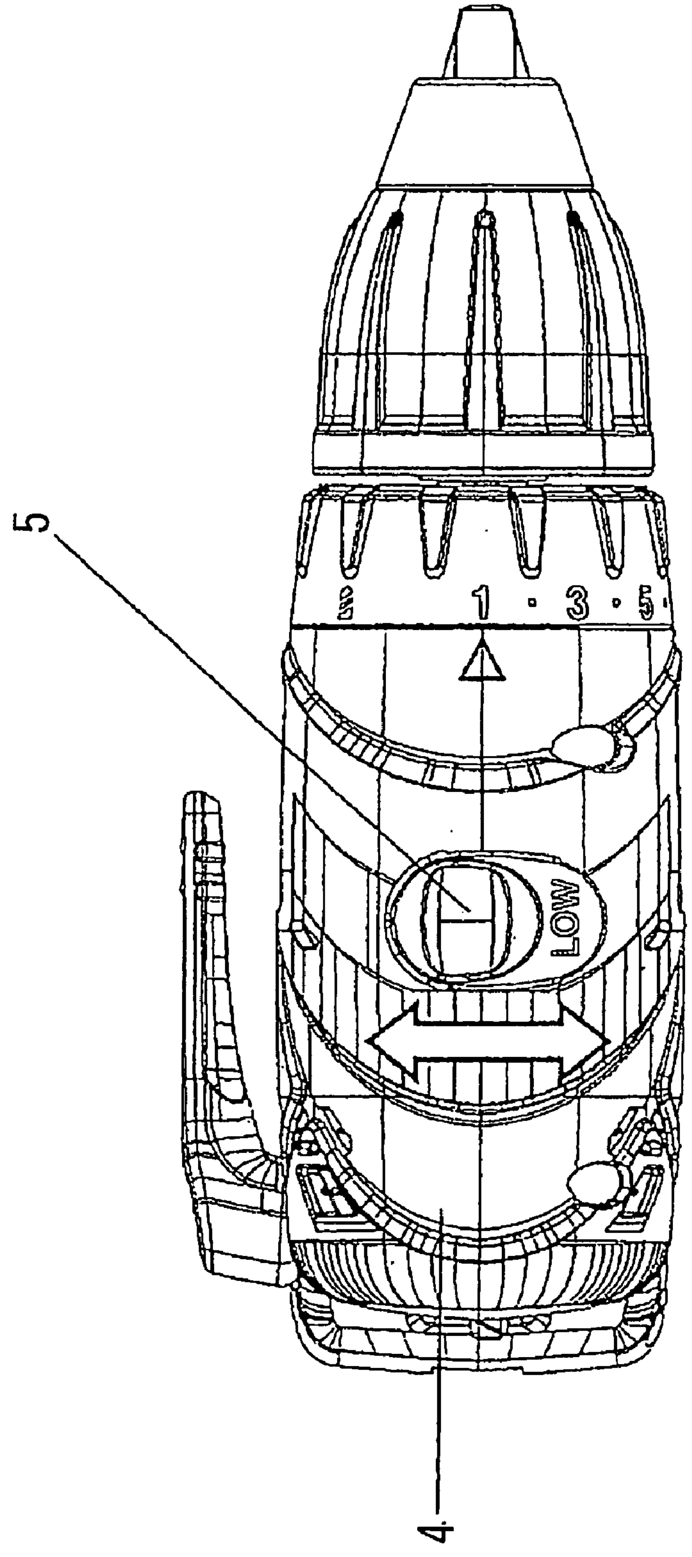
FIG. 11 is a plan view illustrating one example of an instance where the operation direction of the speed changing unit extends in a transverse direction perpendicular to the rotating shaft of a motor.

In the foregoing embodiment, the speed changing unit 5 is operated back and forth along the axial direction D parallel to the rotating shaft 8 of the motor 1 as shown in FIG. 10. Alternatively, the operation direction of the speed changing unit 5 may extend, e.g., in a transverse direction perpendicular to the rotating shaft 8 of the motor 1 as illustrated in FIG. 11.

Figure 14:
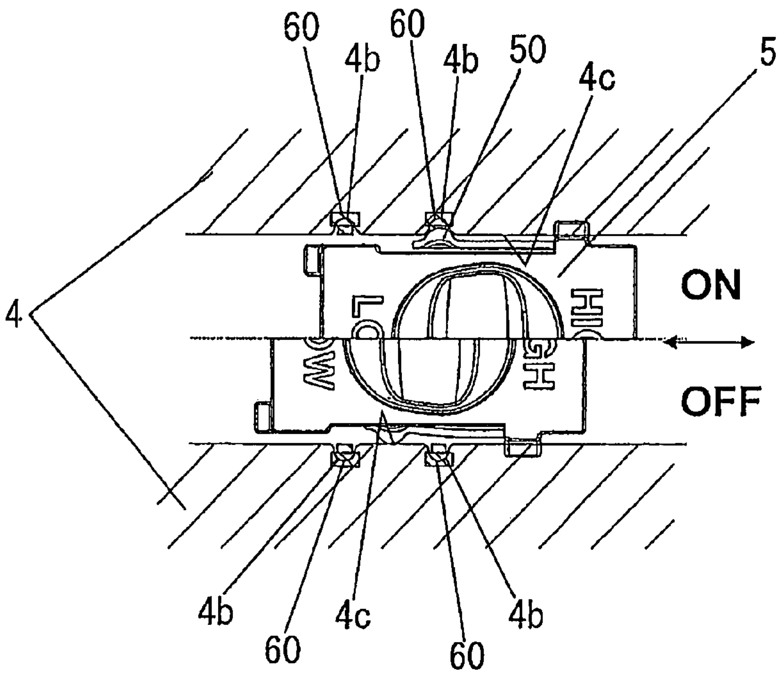
FIG. 14 is a view for explaining an instance where a tact switch of the operation detecting unit is arranged alongside the speed changing unit.
Figure 15:
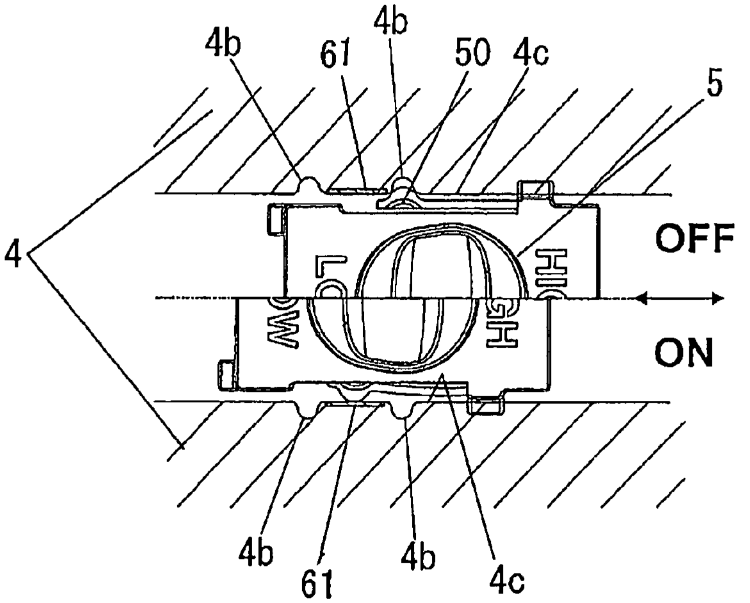
FIG. 15 is a view for explaining an instance where a pressure sensor of the operation detecting unit is arranged alongside the speed changing unit.

While the operation detecting unit 6 is arranged below the speed changing unit 5 in the foregoing embodiment, the operation detecting unit 6 may be positioned alongside the speed changing unit 5, examples of which are shown in FIGS. 14 and 15.

FIG. 14 shows an instance where a tact switch 60 (the operation detecting unit 6) is arranged alongside the speed changing unit 5. FIG. 15 shows an instance where a pressure sensor 61 (the operation detecting unit 6) is arranged alongside the speed changing unit 5. In these instances, an elastic projection 50 movable together with the speed changing unit 5 is formed on the extension surface of the speed changing unit 5, and a ridge-and-groove portion 4*b* and 4*c* is formed in the portion of the housing 4 for accommodating the speed changing unit 5.

With the structure shown in FIG. 14, the operation of the speed changing unit 5 is detected in such a way that, upon operating the speed changing unit 5, the elastic projection 50 normally pressed against the ridge-and-groove portion 4*b* and 4*c* pushes the tact switch 60 provided in the ridge-and-groove portion 4*b* and 4*c*.

With the structure shown in FIG. 15, the operation of the speed changing unit 5 is detected in such a way that, upon operating the speed changing unit 5, the elastic projection 50 pushes the pressure sensor 61 provided in the ridge-and-groove portion 4*b* and 4*c*. The operation detecting unit 6 is not limited to the tact switch and the pressure sensor mentioned above but may be a limit switch, a micro switch or the like.

While the invention has been shown and described with respect to the embodiments, it will be understood by those skilled in the art that various changes and modifications may be made without departing from the scope of the invention as defined in the following claims.

What is claimed is:

1. An electric power tool comprising:

a motor as a driving power source;

a reduction mechanism for transferring the rotating power of the motor, the reduction mechanism having two or more gear stages;

a driving unit for transferring the rotating power of the reduction mechanism to a tip end tool;

a bearing unit for rotatably supporting the driving unit;

a housing for accommodating the motor, the reduction mechanism, the driving unit and the bearing unit within a main body portion thereof, the housing provided with a handle portion;

a speed changing unit for changing a reduction ratio of the reduction mechanism, the speed changing unit being arranged in such a position as to allow an operator to operate the same from the outside of the housing;

a power switch for turning on and off an electric power source of the motor;

an operation detecting unit for detecting a reduction ratio changing operation performed by the speed changing unit; and a control unit for controlling the electric power supplied to the motor depending on the detected speed changing operation, wherein when the detected speed changing operation is to shift a low load operation to a high load operation, the control unit changes the output of the motor from a high-speed low-torque state to a low-speed high-torque state, wherein at least a part of the gears of the reduction mechanism are capable of changing the rotational speed of the driving unit by shifting, and wherein in response to the detected speed changing operation, the control unit adjusts the electric power supplied to the motor before the gears are shifted.

2. The electric power tool of claim 1, wherein the operation detecting unit is operated in synchronism with the speed changing unit.

3. The electric power tool of claim 1, wherein the operation detecting unit is immovable with respect to the housing and is adapted to detect the operation of the speed changing unit by sensing a change in the position of the speed changing unit relative to the housing.

4. The electric power tool of claim 1, wherein the operation detecting unit is adapted to detect the operation of the speed changing unit without making contact with the speed changing unit.

5. The electric power tool of claim 1, wherein the operation detecting unit is adapted to detect a gear shifted by the speed changing unit when changing the reduction ratio of the reduction mechanism.

6. The electric power tool of claim 1, further comprising a braking unit configured to apply brake to the motor when the operation of the speed changing unit is detected.

7. The electric power tool of claim 1, further comprising a detecting unit configured to detect the rotational speed of the motor, and wherein the electric power supplied to the motor is controlled only when the rotational speed of the motor at the moment of detecting the operation of the speed changing unit is greater than a predetermined value.

8. The electric power tool of claim 1, further comprising a maintaining unit configured to maintain the task of controlling the electric power supplied to the motor by detecting the operation of the speed changing unit.

9. The electric power tool of claim 8, further comprising a releasing unit configured to release the task of controlling the electric power supplied to the motor.

10. The electric power tool of claim 1, wherein the speed changing unit is formed of a double story lever operable from the outside of the housing, the double story lever having an upper story portion and a lower story portion, the upper story portion being movable toward the lower story portion, the operation detecting unit including a switch or a sensor attached to the lower story portion, the upper story portion being adapted to be pushed downwardly, upon operating the double story lever, to press the switch or activate the sensor so that the speed changing operation can be detected.

11. An electric power tool comprising:

a motor as a driving power source;

a reduction mechanism for transferring the rotating power of the motor, the reduction mechanism having two or more gear stages;

a driving unit for transferring the rotating power of the reduction mechanism to a tip end tool;

a bearing unit for rotatably supporting the driving unit;

a housing for accommodating the motor, the reduction mechanism, the driving unit and the bearing unit within a main body portion thereof, the housing provided with a handle portion;

a speed changing unit for changing a reduction ratio of the reduction mechanism, the speed changing unit being arranged in such a position as to allow an operator to operate the same from the outside of the housing;

a power switch for turning on and off a power source of the motor;

an operation detecting unit for detecting a reduction ratio changing operation performed by the speed changing unit to control the electric power supplied to the motor; and a maintaining unit configured to maintain the task of controlling the electric power supplied to the motor by detecting the operation of the speed changing unit.

12. The electric power tool of claim 11, further comprising a releasing unit configured to release the task of controlling the electric power supplied to the motor.

13. The electric power tool of claim 11, wherein at least a part of the gears of the reduction mechanism are capable of changing the rotational speed of the driving unit by shifting, and wherein in response to the detected speed changing operation, the control unit adjusts the electric power supplied to the motor before the gears are shifted.

14. An electric power tool comprising:

a motor as a driving power source;

a reduction mechanism for transferring the rotating power of the motor, the reduction mechanism having two or more gear stages;

a driving unit for transferring the rotating power of the reduction mechanism to a tip end tool;

a bearing unit for rotatably supporting the driving unit;

a housing for accommodating the motor, the reduction mechanism, the driving unit and the bearing unit within a main body portion thereof, the housing provided with a handle portion;

a speed changing unit for changing a reduction ratio of the reduction mechanism, the speed changing unit being arranged in such a position as to allow an operator to operate the same from the outside of the housing;

a power switch for turning on and off a power source of the motor;

an operation detecting unit for detecting a reduction ratio changing operation performed by the speed changing unit to control the electric power supplied to the motor, wherein the speed changing unit is formed of a double story lever operable from the outside of the housing, the double story lever having an upper story portion and a lower story portion, the upper story portion being movable toward the lower story portion, the operation detecting unit including a switch or a sensor attached to the lower story portion, the upper story portion being adapted to be pushed downwardly, upon operating the double story lever, to press the switch or activate the sensor so that the speed changing operation can be detected.

15. The electric power tool of claim 14, wherein at least a part of the gears of the reduction mechanism are capable of changing the rotational speed of the driving unit by shifting, and wherein in response to the detected speed changing operation, the control unit adjusts the electric power supplied to the motor before the gears are shifted.

* * * * *